United States Patent
Berger et al.

(10) Patent No.: US 7,572,526 B2
(45) Date of Patent: Aug. 11, 2009

(54) PERPENDICULAR MAGNETIC RECORDING MEDIUM WITH EXCHANGE-SPRING STRUCTURE HAVING MULTIPLE EXCHANGE-SPRING LAYERS AND RECORDING SYSTEM FOR THE MEDIUM

(75) Inventors: Andreas Klaus Berger, San Jose, CA (US); Eric E. Fullerton, San Diego, CA (US); Byron Hassberg Lengsfield, III, Gilroy, CA (US)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 195 days.

(21) Appl. No.: 11/676,299

(22) Filed: Feb. 18, 2007

(65) Prior Publication Data

US 2008/0199735 A1    Aug. 21, 2008

(51) Int. Cl.
G11B 5/66    (2006.01)
G11B 5/667    (2006.01)
G11B 5/716    (2006.01)
G11B 5/673    (2006.01)

(52) U.S. Cl. .......... 428/828.1; 428/827; 428/831.2; 428/832; 428/829; 428/830

(58) Field of Classification Search .......... 428/828.1
See application file for complete search history.

(56) References Cited

U.S. PATENT DOCUMENTS

| | | | |
|---|---|---|---|
| 5,851,643 A * | 12/1998 | Honda et al. | 428/212 |
| 6,468,670 B1 | 10/2002 | Ikeda et al. | |
| 6,641,901 B2 | 11/2003 | Yoshida et al. | |
| 6,773,826 B2 | 8/2004 | Nakagawa et al. | |
| 6,890,667 B1 * | 5/2005 | Lairson et al. | 428/611 |
| 2003/0162041 A1 * | 8/2003 | Nemoto et al. | 428/469 |
| 2006/0177704 A1 | 8/2006 | Berger et al. | |
| 2006/0204791 A1 * | 9/2006 | Sakawaki et al. | 428/828.1 |
| 2006/0246323 A1 * | 11/2006 | Liu et al. | 428/829 |
| 2007/0292720 A1 * | 12/2007 | Suess | 428/828.1 |

OTHER PUBLICATIONS

Suess D. et al. Optimization of Exchange Spring perpendicular Recording Media. Oct. 2005, IEEE Transactions on Magnetics, vol. 41, No. 10, 3166-3168.*

(Continued)

*Primary Examiner*—Jennifer McNeil
*Assistant Examiner*—Vera Katz
(74) *Attorney, Agent, or Firm*—Thomas R. Berthold

(57) ABSTRACT

A perpendicular magnetic recording system uses an exchange-spring type of perpendicular magnetic recording medium. The medium has a recording layer (RL) that includes a lower media layer (ML) and a multilayer exchange-spring layer (ESL) above the ML. The high anisotropy field (high-$H_k$) lower ML and the multilayer ESL are exchange-coupled across a coupling layer. The multilayer ESL has at least two ESLs separated by a coupling layer, with each of the ESLs having an $H_k$ substantially less than the $H_k$ of the ML. The exchange-spring structure with the multilayer ESL takes advantage of the fact that the write field magnitude and write field gradient vary as a function of distance from the write pole. The thicknesses and $H_k$ values of each of the ESLs can be independently varied to optimize the overall recording performance of the medium.

16 Claims, 4 Drawing Sheets

OTHER PUBLICATIONS

Draaisma H. at al. Magnetic Interface Anisotropy in Pd/Co and Pd/Fe Multilayers. 1987, Journal of Magnetism and Magnetic Materials. 351-355.*

Suess D. et al. Exchange Spring media for Perpendicular Recording. 2005, Applied Physics Letters, 87, 012504.*

Benakli et al., "Micromagnetic Study of Switching Speed in Perpendicular Recording Media", IEEE Trans. MAG 37, 1564 (2001).

Gao et al., "Transition Jitter Estimates in Tilted and Conventional Perpendicular Recording Media at 1 Tb/in2", IEEE Trans. MAG 39, 704 (2003).

Victoria et al., "Composite Media for Perpendicular Magnetic Recording", IEEE Trans MAG 41 (2), 537-542, Feb. 2005.

Wang et al., "Composite media (dynamic tilted media) for magnetic recording", Appl. Phys. Lett. 86 (14) Art. No. 142504, Apr. 4, 2005.

Choe et al., "Perpendicular Recording CoPtCrO Composite Media With Performance Enhancement Capping Layer", IEEE Transactions on Magnetics, vol. 41, No. 10, Oct. 2005, pp. 3172-3174.

Suess et al., "Optimization of Exchange Spring Perpendicular Recording Media", IEEE Transactions on Magnetics, vol. 41, No. 10, Oct. 2005, pp. 3166-3168.

Sonobe et al., "Thermally stable CGC perpendicular recording media with Pt-rich CoPtCr and thin Pt layers", IEEE Transactions on Magnetics, vol. 36, No. 5, Sep. 2002, pp. 2006-2011.

Inaba et al., "Preliminary study on (CoPtCr/NiFe)-SiO/sub 2/ hard/soft-stacked perpendicular recording media", IEEE Transactions on Magnetics, vol. 41, Issue 10, , Oct. 2005, pp. 3136-3138.

* cited by examiner

PERPENDICULAR MAGNETIC RECORDING MEDIUM WITH EXCHANGE-SPRING STRUCTURE HAVING MULTIPLE EXCHANGE-SPRING LAYERS AND RECORDING SYSTEM FOR THE MEDIUM

BACKGROUND OF THE INVENTION

1. Field of the Invention

This invention relates generally to perpendicular magnetic recording media, such as disks for use in magnetic recording hard disk drives, and more particularly to media having an exchange-spring structure.

2. Description of the Related Art

Perpendicular magnetic recording, wherein the recorded bits are stored in the generally planar recording layer in a generally perpendicular or out-of-plane orientation (i.e., other than parallel to the surfaces of the disk substrate and the recording layer), is a promising path toward ultra-high recording densities in magnetic recording hard disk drives. A common type of perpendicular magnetic recording system is one that uses a "dual-layer" medium. This type of system is shown in FIG. 1 with a single write pole type of recording head. The dual-layer medium includes a perpendicular magnetic data recording layer (RL) on a "soft" or relatively low-coercivity magnetically permeable underlayer (SUL) formed on the substrate.

One type of material for the RL is a granular ferromagnetic cobalt alloy, such as a CoPtCr alloy, with a hexagonal-close-packed (hcp) crystalline structure having the c-axis oriented generally perpendicular or to the RL. The granular cobalt alloy RL should also have a well-isolated fine-grain structure to produce a high-coercivity media and to reduce intergranular exchange coupling, which is responsible for high intrinsic media noise. Enhancement of grain segregation in the cobalt alloy RL can be achieved by the addition of oxides, including oxides of Si, Ta, Ti, Nb, Cr, V, and B. These oxides tend to segregate to the grain boundaries, and together with the elements of the cobalt alloy form nonmagnetic intergranular material.

The SUL serves as a flux return path for the field from the write pole to the return pole of the recording head. In FIG. 1, the RL is illustrated with perpendicularly recorded or magnetized regions, with adjacent regions having opposite magnetization directions, as represented by the arrows. The magnetic transitions between adjacent oppositely-directed magnetized regions are detectable by the read element or head as the recorded bits.

FIG. 2 is a schematic of a cross-section of a prior art perpendicular magnetic recording disk showing the write field H acting on the recording layer RL. The disk also includes the hard disk substrate that provides a generally planar surface for the subsequently deposited layers. The generally planar layers formed on the surface of the substrate also include a seed or onset layer (OL) for growth of the SUL, an exchange break layer (EBL) to break the magnetic exchange coupling between the magnetically permeable films of the SUL and the RL and to facilitate epitaxial growth of the RL, and a protective overcoat (OC). As shown in FIG. 2, the RL is located inside the gap of the "apparent" recording head (ARH), which allows for significantly higher write fields compared to longitudinal or in-plane recording. The ARH comprises the write pole (FIG. 1) which is the real write head (RWH) above the disk, and a secondary write pole (SWP) beneath the RL. The SWP is facilitated by the SUL, which is decoupled from the RL by the EBL and produces a magnetic mirror image of the RWH during the write process. This effectively brings the RL into the gap of the ARH and allows for a large write field H inside the RL. However, this geometry also results in the write field H inside the RL being oriented nearly normal to the surface of the substrate and the surface of the RL, i.e., along the perpendicular easy axis of the RL grains, as shown by typical grain 1 with easy axis 2. The nearly parallel alignment of the write field H and the RL easy axis has the disadvantage that relatively high write fields are necessary to reverse the magnetization because minimal torque is exerted onto the grain magnetization. Also, a write-field/easy-axis alignment increases the magnetization reversal time of the RL grains, as described by M. Benakli et al., *IEEE Trans. MAG* 37, 1564 (2001).

The use of a trailing shield to the write pole has been proposed to tilt the write field relative to the media anisotropy axis to make magnetization reversal in the RL easier. The trailing shield also has the advantage of an improved write field gradient needed to obtain high density recording. However, the use of a trailing shield comes at the expense of a reduction in magnitude of the effective write field that can be realized.

To also address the problem of write-field/easy-axis alignment, "tilted" media have been theoretically proposed, as described by K.-Z. Gao et al., *IEEE Trans. MAG* 39, 704 (2003), in which the magnetic easy axis of the RL is tilted at an angle of about 45 degrees with respect to the surface normal, so that magnetization reversal can be accomplished with a lower write field and without an increase in the reversal time. While there is no known fabrication process to make high-quality recording media with a tilted easy axis, there have been proposals to achieve a magnetic behavior that emulates tilted media using a media structure compatible with conventional media fabrication techniques. In one technique, the perpendicular recording medium is a composite medium of two ferromagnetically exchange-coupled magnetic layers with substantially different anisotropy fields ($H_k$). (The anisotropy field $H_k$ of a ferromagnetic layer with uniaxial magnetic anisotropy $K_u$ is the magnetic field that would need to be applied along the easy axis to switch the magnetization direction.) Magnetic simulation of this composite medium shows that in the presence of a uniform write field H the magnetization of the lower-$H_k$ layer will rotate first and assist in the reversal of the magnetization of the higher-$H_k$ layer. This behavior, sometimes called the "exchange-spring" behavior, and various types of composite media are described by R. H. Victora et al., "Composite Media for Perpendicular Magnetic Recording", *IEEE Trans MAG* 41 (2), 537-542, February 2005; and J. P. Wang et al., "Composite media (dynamic tilted media) for magnetic recording", *Appl. Phys. Lett.* 86 (14) Art. No. 142504, Apr. 4 2005.

Pending application Ser. No. 11/231,516, published as US2006/0177704A1 on Aug. 10, 2006 and assigned to the same assignee as this application, describes an exchange-spring perpendicular magnetic recording medium with a lower high-$H_k$ magnetic layer (sometimes called the "media" layer) exchange-coupled across a coupling layer to an upper low-$H_k$ magnetic layer (sometimes called the "exchange-spring" layer).

The recording performance of an exchange-spring medium is determined by the lateral and vertical exchange strength provided by the exchange-spring layer, the magnetic moment, the thickness of the layers, the anisotropy field of the exchange-spring layer, and the properties of the media layer. The exchange-spring layer serves several purposes. The exchange-spring effect reduces the write field needed to needed to switch the RL and also serves as a means of reducing the noise in the system by controlling lateral exchange.

However, it is difficult to independently control these parameters to achieve the desired recording performance.

What is needed is an improved exchange-spring type of perpendicular magnetic recording medium that allows better control over the various parameters, like writability, noise performance, thermal stability and resolution, to achieve a medium with the desired recording performance.

SUMMARY OF THE INVENTION

The invention relates to an exchange-spring type of perpendicular magnetic recording medium with a multilayer exchange-spring layer (ESL) and a recording system that incorporates the medium. The recording layer (RL) includes the high-$H_k$ lower media layer (ML) and a multilayer exchange-spring layer (ESL), with the ML and the multilayer ESL being exchange-coupled across a coupling layer. The ESL comprises at least two exchange-spring layers separated by a coupling layer, with each of the ESLs having an $H_k$ substantially less than the $H_k$ of the ML.

The exchange-spring structure with the multilayer ESL takes advantage of the fact that the write field magnitude and write field gradient vary as a function of distance from the write pole. The thicknesses, lateral exchange and $H_k$ values of each of the ESLs can be independently varied to optimize the overall recording performance of the medium. In one example for a medium with a two-layer ESL, the upper ESL has a higher $H_k$ than the lower ESL, resulting in a reduction in the width of an isolated transition (reduced $T_{50}$). In another example, the upper ESL has a lower $H_k$ than the lower ESL, which allows the upper ESL to rotate easier when exposed to the write field and create a greater torque to assist in reversing the magnetization of the lower ESL and the ML.

For a fuller understanding of the nature and advantages of the present invention, reference should be made to the following detailed description taken together with the accompanying figures.

DETAILED DESCRIPTION OF THE INVENTION

Figure 1:
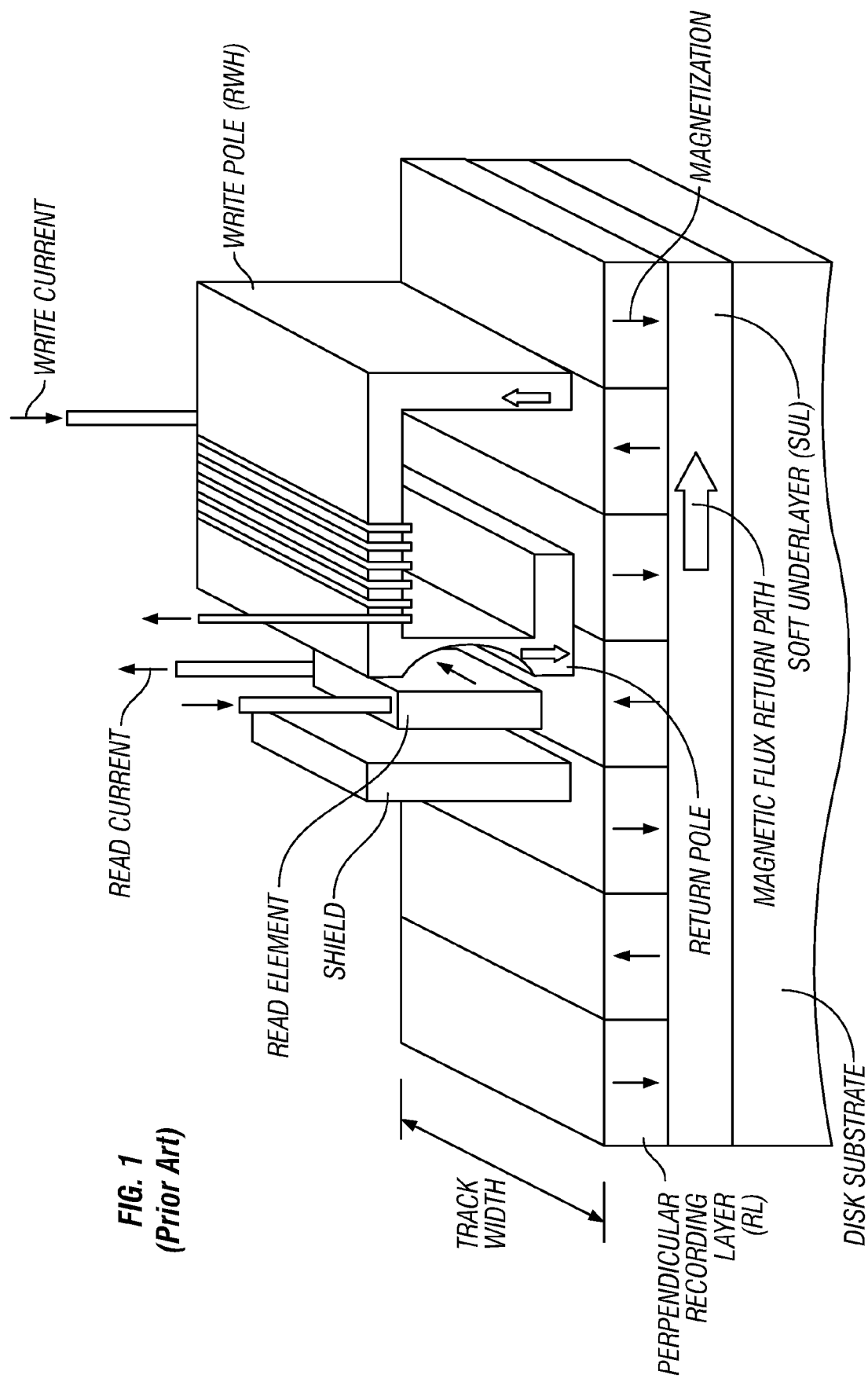
FIG. 1 is a schematic of a prior art perpendicular magnetic recording system.
Figure 2:
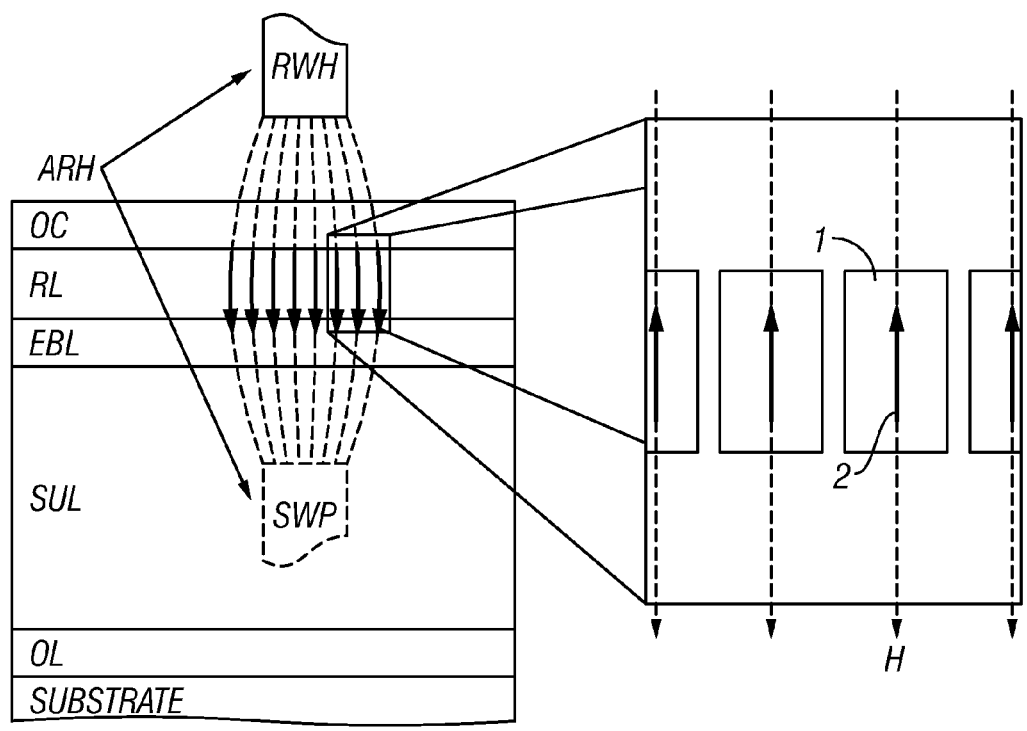
FIG. 2 is a schematic of a cross-section of a prior art perpendicular magnetic recording disk showing the write field H acting on the recording layer (RL).
Figure 3A:
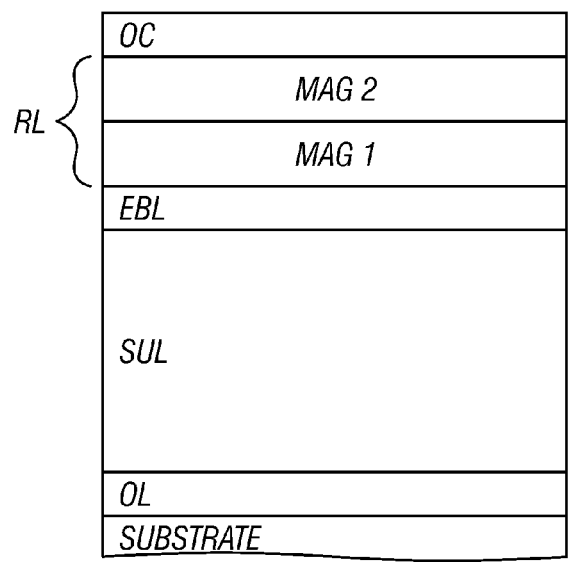
FIG. 3A is a schematic of a cross-section of a prior art perpendicular magnetic recording disk with an exchange-spring recording layer (RL) made up of two ferromagnetically exchange-coupled magnetic layers (MAG1 and MAG2).

FIG. 3A is a schematic of a cross-section of a perpendicular magnetic recording disk according to the prior art with an exchange-spring recording layer (RL) made up of two ferromagnetically exchange-coupled magnetic layers (MAG1 and MAG2). MAG1, sometimes called the exchange-spring layer, and MAG2, sometimes called the media layer, each has perpendicular magnetic anisotropy. However, MAG1 and MAG2 have different magnetic properties, so that they respond differently to the applied write field. For example, one of MAG1 and MAG2 can be magnetically soft (low $H_k$) and the other magnetically hard (high $H_k$). The magnetic grains in the soft layer may be exchange-decoupled from one another, meaning that there is very low intergranular exchange coupling in the soft layer. With a proper interlayer exchange coupling between the grains in MAG1 and MAG2, the soft grains will rotate first under the applied write field, while at the same time providing an exchange field to the hard grains to mimic an effective tilt of their easy axis, thus assisting in the magnetization reversal of the grains in the hard layer. In the prior art disk of FIG. 3A the two magnetic layers MAG1 and MAG2 are in contact and are directly exchange-coupled without an intermediate coupling layer.

Figure 3B:
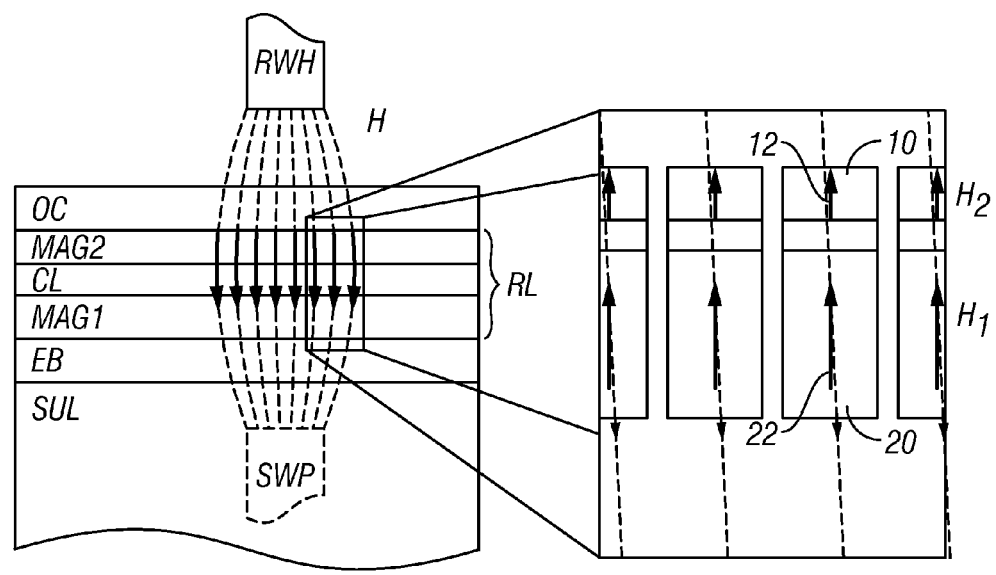
FIG. 3B is a schematic of a cross-section of a perpendicular magnetic recording disk with an exchange-spring recording layer (RL) made up of two magnetic layers (MAG1 and MAG2) separated by a coupling layer (CL), and the fields H1 and H2 acting on MAG1 and MAG2, respectively.

FIG. 3B illustrates an exchange-spring medium like that described in the previously-cited pending applications Ser. No. 11/231,516 wherein a coupling layer (CL) is located between MAG1 and MAG2. The composite RL has at least two exchange-coupled magnetic layers (MAG1 and MAG2), each with generally perpendicular magnetic anisotropy, that are separated by the CL. The exchange-spring layer (MAG2) has a lower $H_k$ than media layer MAG2. The CL provides the appropriate ferromagnetic coupling strength between the magnetic layers. As shown in the expanded portion of FIG. 3B, a typical grain 10 in MAG2 has a generally perpendicular or out-of-plane magnetization along an easy axis 12, and is acted upon by a write field H2. A typical grain 20 in MAG1 below the MAG2 grain 10 also has a perpendicular magnetization along an easy axis 22, and is acted upon by a write field H1 that is less than H2 as a result of MAG1 being farther from the write head than MAG2. In the presence of the applied write field H2, the lower-$H_k$ MAG2 will rotate first and act as a write assist layer by exerting a magnetic torque onto the higher-$H_k$ MAG1 that assists in reversing the magnetization of MAG1. In this non-coherent reversal of the magnetizations of MAG1 and MAG2, MAG2 changes its magnetization orientation in response to a write field and in turn amplifies the "torque," or reverse field, exerted on MAG1, causing MAG1 to change its magnetization direction in response to a weaker write field.

Figure 4:
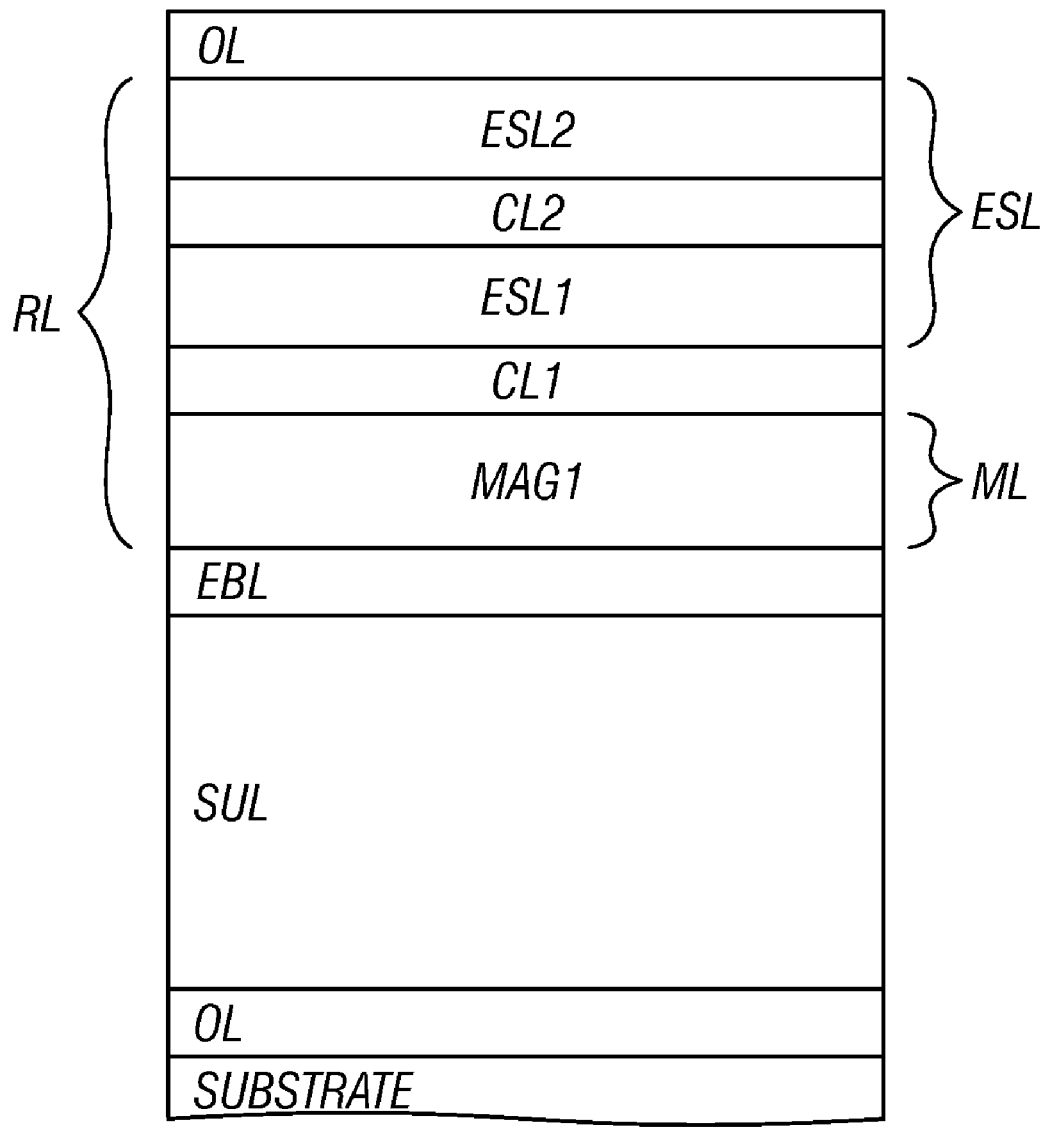
FIG. 4 is a schematic of a cross-section of a perpendicular magnetic recording disk according to this invention.

The exchange-spring type of perpendicular magnetic recording medium according to this invention is shown in the sectional view of FIG. 4. The recording layer (RL) includes the high-$H_k$ lower layer MAG1, which is the media layer (ML) in the exchange-spring structure, and a multilayered exchange-spring layer (ESL), with ML and ESL being exchange-coupled across coupling layer CL1. The ESL comprises at least two exchange-spring layers (ESL1 and ESL2) separated by a coupling layer (CL2), with each of ESL1 and ESL2 having an $H_k$ substantially less than the $H_k$ of MAG1.

A representative disk structure for the medium shown in FIG. 4 will now be described. The hard disk substrate may be any commercially available glass substrate, but may also be a conventional aluminum alloy with a NiP surface coating, or an alternative substrate, such as silicon, canasite or silicon-carbide.

The adhesion layer or OL for the growth of the SUL may be an AlTi alloy or a similar material with a thickness of about 1-10 nm. The SUL may be formed of magnetically permeable materials such as alloys of CoNiFe, FeCoB, CoCuFe, NiFe, FeAlSi, FeTaN, FeN, FeTaC, CoTaZr, CoFeTaZr, CoFeB, and CoZrNb. The SUL may also be a laminated or multilayered SUL formed of multiple soft magnetic films separated by nonmagnetic films, such as electrically conductive films of Al or CoCr. The SUL may also be a laminated or multilayered SUL formed of multiple soft magnetic films separated by interlayer films that mediate an antiferromagnetic coupling, such as Ru, Ir, or Cr or alloys thereof.

The EBL is located on top of the SUL. It acts to break the magnetic exchange coupling between the magnetically permeable films of the SUL and the RL and also serves to facilitate epitaxial growth of the RL. The EBL may not be necessary, but if used it can be a nonmagnetic titanium (Ti) layer; a non-electrically-conducting material such as Si, Ge and SiGe alloys; a metal such as Cr, Ru, W, Zr, Nb, Mo, V and Al; a metal alloy such as amorphous CrTi and NiP; an amorphous carbon such as $CN_x$, $CH_x$ and C; or oxides, nitrides or carbides of an element selected from the group consisting of Si, Al, Zr, Ti, and B. If an EBL is used, a seed layer may be used on top of the SUL before deposition of the EBL. For example, if Ru is used as the EBL, a 1-5 nm thick NiFe or NiW seed layer may be deposited on top of the SUL, followed by a 5-30 nm thick Ru EBL.

Each of the MAG1, ESL1 and ESL2 layers may be formed of any of the known amorphous or crystalline materials and structures that exhibit perpendicular magnetic anisotropy. Thus, one or more of MAG1, ESL1 and ESL2 may be a layer of granular polycrystalline cobalt alloy, such as a CoPt or CoPtCr alloy, with a suitable segregant such as oxides of Si, Ta, Ti, Nb, Cr, V and B. Also, one or more of MAG1, ESL1 and ESL2 may be composed of multilayers with perpendicular magnetic anisotropy, such as Co/Pt, Co/Pd, Fe/Pt and Fe/Pd multilayers, containing a suitable segregant such as the materials mentioned above. However, ESL1 and ESL2 each has a substantially lower anisotropy field ($H_k$) than the $H_k$ of MAG1 to assure that they respond differently to the applied write field and thereby exhibit the exchange-spring behavior to improve writability. A substantially lower $H_k$ means that the $H_k$ value for ESL1 and ESL2 should each be less than about 70% of the $H_k$ value for MAG1. If each of MAG1, ESL1 and ESL2 is formed of a granular CoPtCr alloy, for example, the $H_k$ value of any of the magnetic layers can be increased or decreased by increasing or decreasing, respectively, the concentration of Pt.

Because the CLs (CL1 and CL2) are below magnetic layers, they should be able to sustain the growth of the magnetic layers while mediating a sufficient level of ferromagnetic exchange coupling between the magnetic layers. Hexagonal-close-packed (hcp) materials for instance, which can mediate a weak ferromagnetic coupling and provide a good template for the growth of magnetic layers, are good candidates. Because the CLs must enable an appropriate coupling strength, they should be either nonmagnetic or weakly ferromagnetic. Thus the CLs may be formed of RuCo and RuCoCr alloys with sufficiently low Co content (<about 65 atomic percent), or CoCr and CoCrB alloys with high Cr and/or B content (Cr+B>about 30 atomic percent). Si-oxide or other oxides like oxides of Ta, Ti, Nb, Cr, V and B may be added to these alloys. The CLs may also be formed of face-centered-cubic (fcc) materials, such as Pt or Pd or alloys based on Pt or Pd, because these materials enable a ferromagnetic coupling between magnetic layers of tunable strength (i.e., they reduce the coupling by increasing the thickness) and are compatible with media growth. In addition, the effect of a CL may be realized by controlling the alloy composition, particularly the fraction of a segregant in either the ESL or MAG layers, at the boundary between these layers. Control of inter-layer coupling can also be achieved by controlling the deposition conditions and thus the growth of one or both layers at the interface.

Depending on the choice of material for the CLs, and more particularly on the concentration of cobalt (Co) in the CLs, the CLs may have a thickness of less than 2.0 nm, and more preferably between about 0.2 nm and 1.5 nm. Because Co is highly magnetic, a higher concentration of Co in the CLs may be offset by thickening the CLs to achieve an optimal interlayer exchange coupling between MAG1, ESL1 and ESL2. The inter-layer exchange coupling between MAG1, ESL1 and ESL2 may be optimized, in part, by adjusting the materials and thickness of the CLs. The CLs should provide a coupling strength sufficient to have a considerable effect on the switching field (and the switching field distribution), but small enough to not couple the MAG1, ESL1 and ESL2 layers rigidly together.

The OC formed on top of the RL may be an amorphous "diamond-like" carbon film or other known protective overcoats, such as Si-nitride.

The improved recording properties of the medium according to this invention have been demonstrated by micromagnetic modeling. A test structure (like that shown in FIG. 4) having a 12 nm MAG1 of $H_k$=14 kOe, a 4 nm ESL1 of $H_k$=5 kOe, and a 2 nm ESL2 of $H_k$=7 kOe nm was compared with a reference structure (like that shown in FIG. 3B) having a 12 nm MAG1 of $H_k$=14 kOe and a 8 nm ESL (MAG2) of $H_k$=5 kOe. Key recording performance parameters of jitter (which is the positioning error for bit transitions, measured as the standard deviation of the zero crossings for the readback voltage) and $T_{50}$ (which is the width of an isolated transition, measured as the distance between the +50% and the −50% points of the signal) were calculated. Jitter for the test structure was 1.8 nm compared to 2.2 nm for the reference structure. $T_{50}$ for the test structure was 25.4 nm compared to 26.0 nm for the reference structure. This example shows that a total thickness for the multilayer ESL in the test structure (6 nm) less than the thickness for the ESL in the reference structure (8 nm) results in improved recording performance.

The exchange-spring structure with the multilayer ESL according to this invention enables the thicknesses and $H_k$ values of each of the ESL layers to be varied to optimize the overall recording performance of the medium. The test structure described above is one example: the upper ESL (ESL2) had a higher $H_k$ than the lower ESL (ESL1), resulting in an improved value of $T_{50}$. This requires a greater field from the write head to switch the magnetization of ESL2 than if the $H_k$ value was the same as for ESL1, but ESL2 is closer to the write head and will thus experience a greater head field than ESL1. As another example, ESL2 can have a lower $H_k$ than ESL1, for example 3 kOe vs. 5 kOe. This will enable ESL2 to rotate easier when exposed to the head field and create a greater torque to assist in reversing the magnetization of ESL1 and MAG1. This could, for example, allow the media layer (MAG1) to have a larger value of $H_k$.

While the invention has been shown and described with an RL having an ESL comprised of only two magnetic layers (ESL1 and ESL2) and one coupling layer (CL2), the RL may have three or more magnetic layers in the ESL, with additional CLs as required to mediate an optimized level of exchange coupling between adjacent magnetic layers in the ESL.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A perpendicular magnetic recording medium comprising:
   a substrate; and
   an exchange-spring structure on the substrate and comprising:
      a first ferromagnetic layer on the substrate and having an out-of-plane easy axis of magnetization;
      a second ferromagnetic layer having an out-of-plane easy axis of magnetization, the second ferromagnetic layer having an anisotropy field less than about 70% of the anisotropy field of the first ferromagnetic layer;
      a first coupling layer on the first ferromagnetic layer and between the first and second ferromagnetic layers and permitting ferromagnetic coupling of the first ferromagnetic layer with the second ferromagnetic layer;
      a third ferromagnetic layer having an out-of-plane easy axis of magnetization, the third ferromagnetic layer having an anisotropy field greater than the anisotropy field of the second ferromagnetic layer and less than about 70% of the anisotropy field of the first ferromagnetic layer; and
      a second coupling layer on the second ferromagnetic layer and between the second and third ferromagnetic layers and permitting ferromagnetic coupling of the second ferromagnetic layer with the third ferromagnetic layer.

2. The medium of claim 1 wherein the thickness of the third ferromagnetic layer is less than the thickness of the second ferromagnetic layer.

3. The medium of claim 1 wherein the substrate has a generally planar surface and wherein each of the first, second and third ferromagnetic layers is a hexagonal-close-packed material with its c-axis oriented generally perpendicular to the substrate surface and each of the first and second the coupling layers is a hexagonal-close-packed material with its c-axis oriented generally perpendicular to the substrate surface.

4. The medium of claim 1 wherein each of the first and second coupling layers is formed of a material selected from the group consisting of (a) a RuCo alloy with Co less than about 65 atomic percent, (b) a RuCoCr alloy with Co less than about 65 atomic percent, and (c) an alloy of Co and one or more of Cr and B with the combined content of Cr and B greater than about 30 atomic percent.

5. The medium of claim 4 wherein said at least one coupling layer further comprises one or more oxides of one or more elements selected from the group consisting of Si, Ta, Ti, Nb, Cr, V and B.

6. The medium of 1 further comprising an underlayer of magnetically permeable material on the substrate and an exchange break layer between the underlayer and the first ferromagnetic layer for preventing magnetic exchange coupling between the underlayer and the first ferromagnetic layer.

7. The medium of claim 1 wherein each of the first, second and third ferromagnetic layers is a granular polycrystalline cobalt alloy.

8. The medium of claim 7 wherein at least one of the first, second and third ferromagnetic layers further comprises an oxide of one or more of Si, Ta, Ti, Nb, Cr, V and B.

9. The medium of claim 1 wherein at least one of the first, second and third ferromagnetic layers is a multilayer selected from the group consisting of Co/Pt, Co/Pd, Fe/Pt and Fe/Pd multilayers.

10. A perpendicular magnetic recording disk comprising:
   a substrate having a generally planar surface;
   an underlayer of magnetically permeable material on the substrate surface; and
   an exchange-spring structure on the underlayer and comprising:
      a first ferromagnetic layer of granular polycrystalline cobalt alloy on the underlayer and having an out-of-plane easy axis of magnetization;
      a second ferromagnetic layer of granular polycrystalline cobalt alloy having an out-of-plane easy axis of magnetization, the second ferromagnetic layer having an anisotropy field less than about 70% of the anisotropy field of the first ferromagnetic layer;
      a first coupling layer on the first ferromagnetic layer and between the first and second ferromagnetic layers and permitting ferromagnetic coupling of the first ferromagnetic layer with the second ferromagnetic layer;
      a third ferromagnetic layer of granular polycrystalline cobalt alloy having an out-of-plane easy axis of magnetization, the third ferromagnetic layer having an anisotropy field greater than the anisotropy field of the second ferromagnetic layer and less than about 70% of the anisotropy field of the first ferromagnetic layer; and
      a second coupling layer on the second ferromagnetic layer and between the second and third ferromagnetic layers and permitting ferromagnetic coupling of the second ferromagnetic layer with the third ferromagnetic layer.

11. The disk of claim 10 wherein the thickness of the third ferromagnetic layer is less than the thickness of the second ferromagnetic layer.

12. The disk of claim 10 wherein each of the first and second coupling layers is formed of a material selected from the group consisting of (a) a RuCo alloy with Co less than about 65 atomic percent, (b) a RuCoCr alloy with Co less than about 65 atomic percent, and (c) an alloy of Co and one or more of Cr and B with the combined content of Cr and B greater than about 30 atomic percent.

13. The disk of claim 12 wherein said at least one coupling layer further comprises one or more oxides of one or more elements selected from the group consisting of Si, Ta, Ti, Nb, Cr, V and B.

14. The disk of 10 further comprising an exchange break layer between the underlayer and the first ferromagnetic layer for preventing magnetic exchange coupling between the underlayer and the first ferromagnetic layer.

15. The disk of claim 10 wherein at least one of the first, second and third ferromagnetic layers further comprises an oxide of one or more of Si, Ta, Ti, Nb, Cr, V and B.

16. A perpendicular magnetic recording system comprising:
   the disk of claim 10;
   a write head for magnetizing regions in the ferromagnetically coupled first, second and third ferromagnetic layers of said disk; and
   a read head for detecting the transitions between said magnetized regions.

* * * * *